United States Patent
Liu et al.

(10) Patent No.: US 11,429,962 B2
(45) Date of Patent: *Aug. 30, 2022

(54) RECOVERING ENCRYPTED TRANSACTION INFORMATION IN BLOCKCHAIN CONFIDENTIAL TRANSACTIONS

(71) Applicant: Advanced New Technologies Co., Ltd., Grand Cayman (KY)

(72) Inventors: Zheng Liu, Hangzhou (CN); Lichun Li, Hangzhou (CN); Shan Yin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,541

(22) Filed: Jul. 1, 2021

(65) Prior Publication Data

US 2021/0334795 A1 Oct. 28, 2021

Related U.S. Application Data

(63) Continuation of application No. 16/390,926, filed on Apr. 22, 2019, now Pat. No. 11,055,709, which is a
(Continued)

(51) Int. Cl.
*G06Q 20/38* (2012.01)
*H04L 9/08* (2006.01)
(Continued)

(52) U.S. Cl.
CPC ....... *G06Q 20/389* (2013.01); *G06Q 20/3829* (2013.01); *H04L 9/085* (2013.01);
(Continued)

(58) Field of Classification Search
CPC ............ G06Q 20/389; G06Q 20/3829; G06Q 2220/00; H04L 9/3218; H04L 9/3239;
(Continued)

(56) References Cited

U.S. PATENT DOCUMENTS 10,299,113 B1 5/2019 Viswanathan et al.
2005/0246292 A1 11/2005 Sarcanin
(Continued)

FOREIGN PATENT DOCUMENTS

CN 106549749 3/2017
CN 106982205 7/2017
(Continued)

OTHER PUBLICATIONS

Ben Sasson et al., "Zerocash: Decentralized Anonymous Payments from Bitcoin", IEEE, 2014 IEEE Symposium on Security and Privacy (Year: 2014).*
(Continued)

*Primary Examiner* — Zeshan Qayyum
*Assistant Examiner* — Yingying Zhou
(74) *Attorney, Agent, or Firm* — Fish & Richardson P.C.

(57) ABSTRACT

Implementations of the present disclosure include obtaining a secret key, by a client node, according to a threshold secret sharing scheme agreed to by a number of client nodes; generating one or more commitment values of a confidential transaction of the client node by applying a cryptographic commitment scheme to transaction data; generating encrypted transaction information of the confidential transaction by encrypting the transaction data using the secret key; and transmitting, to a consensus node of a blockchain network, a content of the confidential transaction for execution, wherein the content of the confidential transaction includes: the one or more commitment values; the encrypted transaction information; and one or more zero-knowledge proofs of the transaction data.

20 Claims, 5 Drawing Sheets

Related U.S. Application Data continuation of application No. PCT/CN2018/114322, filed on Nov. 7, 2018.

(51) Int. Cl.
 H04L 9/32 (2006.01)
 H04L 9/40 (2022.01)

(52) U.S. Cl.
 CPC .......... H04L 9/3218 (2013.01); H04L 9/3221 (2013.01); H04L 9/3239 (2013.01); H04L 63/0435 (2013.01); G06Q 2220/00 (2013.01); H04L 2209/38 (2013.01); H04L 2209/56 (2013.01)

(58) Field of Classification Search
 CPC ............... H04L 9/3221; H04L 63/0435; H04L 9/085; H04L 2209/56; H04L 2209/38; H04L 9/0838; H04L 9/0869
 See application file for complete search history.

(56) References Cited

U.S. PATENT DOCUMENTS

| | | | |
|---|---|---|---|
| 2008/0059351 | A1 | 3/2008 | Richey et al. |
| 2012/0209790 | A1 | 8/2012 | Szydlo |
| 2016/0156595 | A1 | 6/2016 | Wu et al. |
| 2016/0162897 | A1 | 6/2016 | Feeney |
| 2016/0358165 | A1* | 12/2016 | Maxwell ............... H04L 9/3239 |
| 2017/0048209 | A1 | 2/2017 | Lohe et al. |
| 2017/0289111 | A1 | 10/2017 | Voell et al. |
| 2017/0346833 | A1 | 11/2017 | Zhang |
| 2017/0366357 | A1 | 12/2017 | Pattanaik et al. |
| 2018/0121909 | A1 | 5/2018 | Christidis et al. |
| 2018/0183768 | A1 | 6/2018 | Lobban et al. |
| 2018/0191503 | A1 | 7/2018 | Alwar et al. |
| 2018/0227116 | A1 | 8/2018 | Chapman et al. |
| 2018/0309567 | A1 | 10/2018 | Wooden |
| 2018/0367298 | A1* | 12/2018 | Wright .................... H04L 9/085 |
| 2019/0036906 | A1 | 1/2019 | Biyani et al. |
| 2019/0109713 | A1 | 4/2019 | Clark et al. |
| 2019/0182055 | A1 | 6/2019 | Christidis et al. |
| 2019/0251270 | A1 | 8/2019 | Liu et al. |
| 2019/0251558 | A1 | 8/2019 | Liu et al. |
| 2019/0273610 | A1 | 9/2019 | Fan et al. |
| 2020/0184471 | A1 | 6/2020 | Liu et al. |

FOREIGN PATENT DOCUMENTS

| | | |
|---|---|---|
| CN | 107566337 | 1/2018 |
| CN | 107666388 | 2/2018 |
| CN | 107833135 | 3/2018 |
| CN | 108021821 | 5/2018 |
| CN | 108418689 | 8/2018 |
| CN | 108418783 | 8/2018 |
| CN | 108492105 | 9/2018 |
| CN | 108712261 | 10/2018 |
| CN | 108764874 | 11/2018 |
| CN | 108769173 | 11/2018 |
| EP | 3499847 | 6/2019 |
| JP | 6293245 | 3/2018 |
| JP | 20181659777 | 10/2018 |
| KR | 20180115701 | 10/2018 |
| RU | 2300845 | 6/2007 |
| RU | 2663476 | 8/2018 |
| WO | WO 2017182601 | 10/2017 |
| WO | WO 2018008202 | 1/2018 |
| WO | WO 2018109010 | 6/2018 |

OTHER PUBLICATIONS

Adam Gibson, An investigation into Confidential Transactions, Jul. 12, 2018, Github (Year: 2018).*

Corda.net [online], "Corda: An Open Source Blockchain Platform for Businesses," Corda Home Page, available on or before Jul. 2019, [retrieved on Jul. 10, 2019], retrieved from: URL<https://www.corda.net/>, 7 pages.

Crosby et al., "BlockChain Technology: Beyond Bitcoin," Sutardja Center for Entrepreneurship & Technology Technical Report, Oct. 16, 2015, 35 pages.

European Extended Search Report in European Patent Application No. 18866054.2, dated Oct. 30, 2019, 10 pages.

Extended European Search Report in European Application No. 18866460.1, dated Dec. 4, 2019, 10 pages.

Fisco.com.cn [online]. "Financial Blockchain Shenzhen Consortium," Fisco Home Page, available on or before Jul. 2019, [retrieved on Jul. 10, 2019]. retrieved from: URL<https://www.fisco.com.cn>, 2 pages.

Fuchita, "Blockchain and Innovation in Financial Transactions," Nomura Capital Markets Quarterly, Nov. 2015, 3 pages (with English translation).

Gibson. Github.com [online], "An Investigation into Confidential Transactions," Jul. 12, 2018, retrieved on Oct. 7, 2020. retrieved from URL<https://github.com/AdamISZ/ConfidentialTransactionsDoc/blob/master/essayonCT.pdf>. 39 pages.

Inpher.io [online]. "Inpher Secret Computing," Inpher Home Webpage, [retrieved on May 24, 2019], retrieved from: URL<https://www.inpher.io/>, 7 pages.

International Search Report and Written Opinion in International Application No. PCT/CN2018/114314, dated Aug. 7, 2019, 8 pages.

International Search Report and Written Opinion in International Application No. PCT/CN2018/114322, dated Jul. 30, 2019, 8 pages.

Kim et al., "Security Model of Smart Contract Based Private BlockChain Using Commitment Scheme," Journal of The Korea Contents Association, Jul. 2019, 18(7):620-627 (with English abstract).

Linder, "DEcryption Contract ENforcement Tool (Decent): A Practical Alternative to Government Decryption Backdoors," IACR International Association For Cryptologic Research, Mar. 2016. Apr. 1, 2016:160351. pp. 1-18.

Naganuma et al., "Auditable Zerocoin," 2017 Symposium on Cryptography and Information Security, Jan. 2017, 6 pages (with English abstract only).

Nakamoto, "Bitcoin: A Peer-to-Peer Electronic Cash System," www.bitcoin.org, 2005, 9 pages.

PCT International Preliminary Report on Patentability in International Application No. PCT/CN2018/114322, dated May 11, 2021, 5 pages.

Poelstra, scalingbitcoin.org [online], "Mimblewimble." Oct. 2016, retrieved on Feb. 3, 2020. retrieved from URL<https://scalingbitcoin.org/he/papers/mimblewimble.pdf>, 19 pages.

Sasson et al., "Zerocash: Decentralized Anonymous Payments from Bitcoin," 2014 IEEE Symposium on Security and Privacy, May 2014, pp. 459-474.

Tistory.com [online], "[blockchain] What is zero-knowledge proof? ," retrieved on Feb. 3, 2020, retrieved from URL<https:crazia.tistory.com/entry/blockchain-%EC%98%81%EC%A7%80%EC%8B%9D%EC%A6%9D%EB%AA%85zeroknowledgeproof-%EB%9E%80>. 4 pages (with machine translation).

Tistory.com [online], "Bitcoin Transactions and Mining." Jun. 2017, retrieved on Feb. 3, 2020, retrieved from URL<https://sancs.tistory.com/162>, 11 pages (with machine translation).

Usenix.org [online], "zkLedger: Privacy-Preserving Auditing for Distributed Ledgers," NSDI: Conference 2018, available on or before Jul. 2019, [retrieved on Jul. 10, 2019], retrieved from: URL<https://www.usenix.org/conference/nsdi18/presentation/narula>, 3 pages.

Wanchain.org [online], "Build the Future of Finance," Wanchain Home Page, available on or before Jul. 2019, [retrieved on Jul. 10, 2019], retrieved from: URL<https://wanchain.org/>, 9 pages.

White, "How Computers Work," Introduction and Part 1 Overview, 7th Edition, Que, Oct. 2003, 23 pages.

Wikipedia.org [online], "Commitment Scheme." Jul. 15, 2011, retrieved on Mar. 3, 2021, retrieved from URL<https://en.wikipedia.org/wiki/Commitment_scheme>, 9 pages.

(56) References Cited

OTHER PUBLICATIONS

Yaga et al., "Blockchain Technology Overview," NIST, Oct. 2018, 68 pages.

* cited by examiner

RECOVERING ENCRYPTED TRANSACTION INFORMATION IN BLOCKCHAIN CONFIDENTIAL TRANSACTIONS

CROSS-REFERENCE TO RELATED APPLICATIONS

This application is a continuation of U.S. patent application Ser. No. 16/390,926, now allowed, filed on Apr. 22, 2019, which is a continuation of PCT Application No. PCT/CN2018/114322, filed on Nov. 7, 2018, and each application is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Blockchains are used in crypto-currency networks, which enable participants to conduct transactions to buy/sell goods, and/or services using a crypto-currency. A common crypto-currency includes Bitcoin. In crypto-currency networks, record-keeping models are used to record transactions between users. Example record-keeping models include an unspent transaction output (UTXO) model, and account model (also referred to as account-based model or account/balance model).

In the UTXO model, the assets on the chain are in the form of transactions. Each transaction spends output from prior transactions and generates new outputs that can be spent in subsequent transactions. A user's unspent transactions are tracked, and a balance that the user has to spend is calculated as the sum of the unspent transactions. Each transaction takes one or more unspent outputs (and only unspent outputs) as input and can have one or more outputs. The requirement that only unspent outputs may be used in further transactions is necessary to prevent double spending and fraud. The UTXO model supports the transaction validation and proof function, but the support for smart contracts is weak.

The account model is adopted by Ethereum. The account model performs record-keeping and manages account balances like a traditional bank. Under this model, an account can have an address and a corresponding account balance. Assets on the chain are represented as the balance of the account. Each transfer transaction can have an account address of a transferred asset and an account address of a received asset. The transaction amount is directly updated on the balance of the account. The account model is efficient as each transaction may only need to validate that the sending account has enough balance to pay for the transaction. In addition to supporting the transaction validation and proof function, the account model can fully support smart contracts, especially those that require state information or involve multiple parties.

SUMMARY

Implementations of the present disclosure include computer-implemented methods for confidential transactions based on blockchain technologies (referred to as blockchain confidential transactions or, simply, confidential transactions). More particularly, implementations of the present disclosure are directed to recovering encrypted transaction information in blockchain confidential transactions.

In some implementations, actions include obtaining a secret key, by a client node, according to a threshold secret sharing scheme agreed to by a number of client nodes; generating one or more commitment values of a confidential transaction of the client node by applying a cryptographic commitment scheme to transaction data; generating encrypted transaction information of the confidential transaction by encrypting the transaction data using the secret key; and transmitting, to a consensus node of a blockchain network, a content of the confidential transaction for execution, wherein the content of the confidential transaction includes: the one or more commitment values; the encrypted transaction information; and one or more zero-knowledge proofs of the transaction data.

In some implementations, actions include receiving a content of a confidential transaction of a client node, by a consensus node of a blockchain network, wherein the content of the confidential transaction includes: one or more commitment values of the confidential transaction generated by the client node by applying a cryptographic commitment scheme to transaction data of the confidential transaction; and encrypted transaction information generated by encrypting the transaction data using a secret key of the client node, wherein a secret key is obtained by the client node according to a threshold secret sharing scheme with a number of client nodes; and one or more zero-knowledge proofs of the transaction data; verifying, by the consensus node of the blockchain network, that the confidential transaction is valid based on the content of the confidential transaction; and storing, by the consensus node of the blockchain network, the encrypted transaction information on a blockchain of the blockchain network.

In some implementations, actions include receiving, by a particular client node from a consensus node of a blockchain network, encrypted transaction information of a confidential transaction of the particular client node, wherein the encrypted transaction information is stored in at least one blockchain in the blockchain network, wherein the particular client node does not have access to a secret key configured to decrypt the encrypted transaction information, and where the particular client node was previously issued the secret key; recovering, by the particular client node, the secret key from at least a threshold number of client nodes among a number of client nodes on the blockchain network, according to a threshold secret sharing scheme agreed to by the number of client nodes; and decrypting, by the particular client node, transaction data of the confidential transaction of the particular client node from the encrypted transaction information using the recovered secret key.

Other implementations include corresponding systems, apparatus, and computer programs, configured to perform the actions of the methods, encoded on computer storage devices.

These and other implementations may each optionally include one or more of the following features:

A first feature, combinable with any of the following features, wherein the transaction data of the confidential transaction includes one or both of an account balance of the client node before the confidential transaction or a transaction amount of the confidential transaction.

A second feature, combinable with any of the previous or following features, wherein the one or more zero-knowledge proofs of the transaction data include one or more zero-knowledge range proofs that values of the transaction data are within respective ranges.

A third feature, combinable with any of the previous or following features, wherein the cryptographic commitment scheme includes a Pedersen Commitment scheme; wherein generating one or more commitment values of a confidential transaction of the client node by applying a cryptographic commitment scheme to transaction data includes generating the one or more commitment values of the confidential transaction of the client node based on the transaction data and random numbers corresponding to the transaction data; and wherein generating encrypted transaction information of the confidential transaction includes generating encrypted transaction information of the confidential transaction by encrypting the transaction data and random numbers corresponding to the transaction data using the secret key.

A fourth feature, combinable with any of the previous or following features, wherein the threshold secret sharing scheme includes a Shamir's secret sharing scheme.

A fifth feature, combinable with any of the previous or following features, wherein verifying that the confidential transaction is valid based on the content of the confidential transaction includes: determining that the one or more commitment values are correct based on the commitment scheme; and verifying the one or more zero-knowledge proofs of the transaction data.

A sixth feature, combinable with any of the previous or following features, wherein verifying the one or more zero-knowledge proofs of the transaction data includes: determining that an account balance of the client node before the confidential transaction is larger than zero; and determining that a transaction amount of the confidential transaction is less than or equal to an account balance of the client node before the confidential transaction.

A seventh feature, combinable with any of the previous or following features, wherein the cryptographic commitment scheme is homomorphic, and the method further includes updating an account balance of the client node after the confidential transaction based on homomorphism of the commitment scheme.

An eighth feature, combinable with any of the previous or following features, wherein decrypting transaction data of the confidential transaction of the particular client node from the encrypted transaction information using the secret key includes recovering a transfer amount of the confidential transaction using the secret key.

A ninth feature, combinable with any of the previous or following features, wherein decrypting transaction data of the confidential transaction of the particular client node from the encrypted transaction information using the secret key includes recovering both a transfer amount of the confidential transaction and a random number corresponding to the transfer amount using the secret key, wherein the transfer amount and the random number are used in a Pedersen Commitment scheme for concealing transaction information of the confidential transaction of the particular client node.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
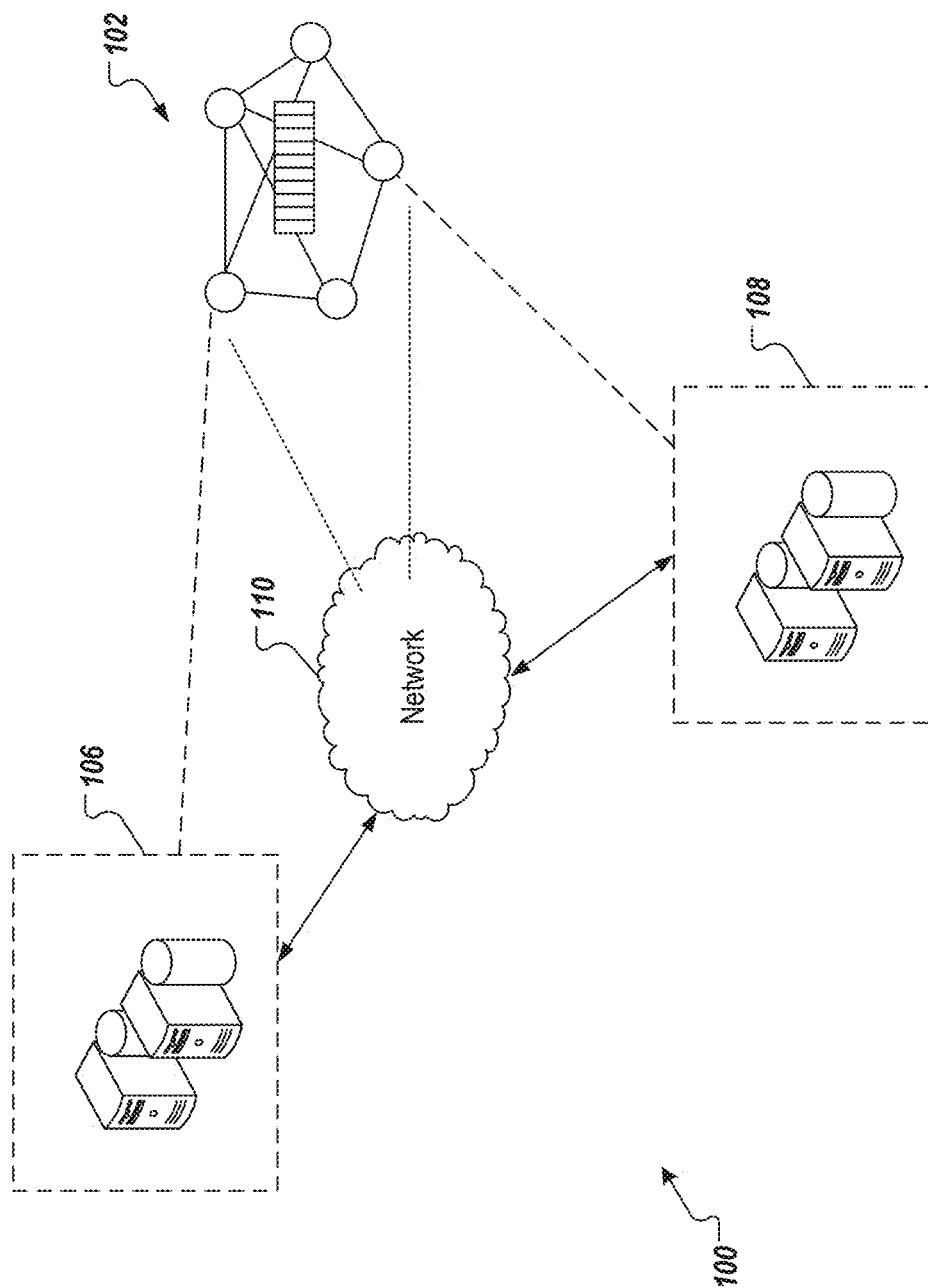
FIG. 1 depicts an example environment that can be used to execute implementations of the present disclosure.

Implementations of the present disclosure include computer-implemented methods for confidential transactions based on blockchain technologies. More particularly, implementations of the present disclosure are directed to recovering encrypted transaction information in blockchain confidential transactions.

In some implementations, actions include obtaining a secret key, by a client node, according to a threshold secret sharing scheme agreed to by a number of client nodes; generating one or more commitment values of a confidential transaction of the client node by applying a cryptographic commitment scheme to transaction data; generating encrypted transaction information of the confidential transaction by encrypting the transaction data using the secret key; and transmitting, to a consensus node of a blockchain network, a content of the confidential transaction for execution, wherein the content of the confidential transaction includes: the one or more commitment values; the encrypted transaction information; and one or more zero-knowledge proofs of the transaction data.

In some implementations, actions include receiving a content of a confidential transaction of a client node, by a consensus node of a blockchain network, wherein the content of the confidential transaction includes: one or more commitment values of the confidential transaction generated by the client node by applying a cryptographic commitment scheme to transaction data of the confidential transaction; and encrypted transaction information generated by encrypting the transaction data using a secret key of the client node, wherein a secret key is obtained by the client node according to a threshold secret sharing scheme with a number of client nodes; and one or more zero-knowledge proofs of the transaction data; verifying, by the consensus node of the blockchain network, that the confidential transaction is valid based on the content of the confidential transaction; and storing, by the consensus node of the blockchain network, the encrypted transaction information on a blockchain of the blockchain network.

In some implementations, actions include receiving, by a particular client node from a consensus node of a blockchain network, encrypted transaction information of a confidential transaction of the particular client node, wherein the encrypted transaction information is stored in at least one blockchain in the blockchain network, wherein the particular client node does not have access to a secret key configured to decrypt the encrypted transaction information, and where the particular client node was previously issued the secret key; recovering, by the particular client node, the secret key from at least a threshold number of client nodes among a number of client nodes on the blockchain network, according to a threshold secret sharing scheme agreed to by the number of client nodes; and decrypting, by the particular client node, transaction data of the confidential transaction of the particular client node from the encrypted transaction information using the recovered secret key.

To provide further context for implementations of the present disclosure, and as introduced above, distributed ledger systems (DLSs), which can also be referred to as consensus networks (e.g., made up of peer-to-peer nodes), and blockchain networks, enable participating entities to securely and immutably conduct transactions and store data. Although the term blockchain is generally associated with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network is provided for a particular entity, which centrally controls read and write permissions. The entity controls which nodes are able to participate in the blockchain network. Consequently, private blockchain networks are generally referred to as permissioned networks that place restrictions on who is allowed to participate in the network and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a consortium blockchain network. It is contemplated, however, that implementations of the present disclosure can be realized in any appropriate type of blockchain network.

Implementations of the present disclosure are described in further detail herein in view of the above context. More particularly, and as introduced above, implementations of the present disclosure are directed to regulating blockchain confidential transactions.

A blockchain is a tamper-proof, shared digital ledger that records transactions in a public or private peer-to-peer network. The ledger is distributed to all member nodes in the network and the history of asset transactions occurring in the network is permanently recorded in the block. Since the ledger is entirely public to the participating entities, the blockchain ledger itself has no privacy protection function and requires additional technology to protect the privacy of the content of asset transaction.

Techniques for privacy protection for blockchain can include those for realizing a confidential transaction to protect privacy of a content of a transaction. In a confidential transaction, the content of a transaction is only accessible or known by participants of the transaction, not any other outsiders. For example, a confidential transaction allows only the two parties partaking in the transaction to be privy to the amount being transacted, and outside observers are prevented from knowing this information. Such techniques for realizing confidential transactions have been used, for example, in MONERO and ZCASH.

Techniques for privacy protection for blockchain can also include those for protecting identities of parties to a transaction can be realize, for example, using a stealth address or a ring signature mechanism.

With privacy protection added to the blockchain (for example, in the context of confidential transactions), a commitment scheme such as Pedersen Commitment scheme can be used to conceal or encrypt certain transaction information of a client node. The transaction information can include, for example, a user's account balance before the transaction, a transaction amount, and/or other information. For example, a client node (also referred to as a client, a user, a party, or a participant of the transaction) can promise or commit to a pre-transaction account balance a and a corresponding random number r according to the Pedersen Commitment scheme. The client node can save the value a and the random number r. Once a or r corresponding to the commitment is lost, the balance in the account cannot be used by the client node. For example, in a case where both a and r are lost, the client node neither knows the balance a nor the random number r corresponding to the balance. In a case where only r but not a is lost, the client node can know the balance t, but cannot use its own balance because the use of the balance involves operations of r. In a case where a is lost, the client does not know his or her own balance. The client node cannot restore or recover the plaintext amount a if the computing power of the client node is limited.

Example techniques are described to solve the above-described problem when a commitment scheme (e.g., the Pedersen Commitment) is used for concealing or encrypting information of a transaction. The described techniques can make it possible and easier for a client node to recover the original plaintext transaction information (e.g., the committed value a and/or the random number r) in the case where such transaction information is lost.

The described techniques include a recovery scheme for recovering concealed transaction information (e.g., a committed transaction value a that has been lost) in blockchain confidential transactions. In some implementations, the described techniques include storing the concealed transaction information in one or more blockchains in a blockchain network. In some implementations, the concealed transaction information of a confidential transaction stored in the blockchain can be encrypted. The information before encryption can be referred to as plaintext information. The resulting information after encryption can be referred to as encrypted or ciphertext information.

In some implementations, a client node can encrypt certain transaction data (i.e., plaintext transaction data) into encrypted or ciphertext transaction data using a secret key. For example, a client node can encrypt both a plaintext value (e.g., the account information) and a random number corresponding to the plaintext value according to the Pedersen Commitment using a secret key. The resulting encrypted transaction information of the confidential transaction (e.g., the encrypted random number and the encrypted plaintext value) can be included as a part of a content of the transaction and submitted for execution by the blockchain network. One or more blockchain nodes can store the encrypted transaction information, for example, in one or more blockchains in the blockchain network. The client node can retrieve the encrypted transaction information corresponding to the client node from the one or more blockchain nodes, and decrypt the plaintext transaction data from the encrypted transaction information using the secret key.

In some implementations, the client node may lose the plaintext transaction data and/or the secret key. For example, if the client node saved the plaintext transaction data and/or the secret key locally, on a data storage of the client node, the client node may lose the plaintext transaction data and/or the secret key when the data storage is compromised or damaged. The described techniques can help recover the plaintext transaction data and/or the secret key.

In some implementations, the secret key of the client node can be generated according to a threshold secret sharing scheme (e.g., Shamir's secret sharing scheme) for secure multi-party calculation (MPC). For example, a private secret key corresponding to the encryption commitment of the client node can be negotiated and generated among a total number of participants (e.g., n participants) of the Shamir's secret sharing scheme. The secret key can be divided into multiple parts and stored by the total number of participants, respectively, thereby avoiding the leakage of the secret key of the client node. In the case where the client node loses the secret key, the client node can recover the secret key according to the Shamir's secret sharing scheme by receiving at least a threshold number of the parts of (e.g., k parts) the secret key from at least k out of n participants. Accordingly, the client node can recover the secret key and use the secret key to decrypt the plaintext transaction data from the encrypted transaction information using the secret key.

The described techniques can help recover the secret key and the plaintext transaction data of a confidential transaction. The described techniques do not rely on a hardware-based backup scheme, in which client nodes use their hardware to back up their secret keys (e.g., in hardware-based wallets). The described techniques can provide enhanced security and robustness of the transaction data as the transaction data are stored on one or more blockchains in the blockchain network. The described techniques can provide a client node access to its secret key, regardless of an implementation of a hardware-based wallet or a software-based wallet. The described techniques may achieve additional or different advantages.

FIG. 1 depicts an example environment 100 that can be used to execute implementations of the present disclosure. In some examples, the example environment 100 enables entities to participate in a consortium blockchain network 102. The example environment 100 includes computing devices or systems 106, 108, and a network 110. In some examples, the network 110 includes a local area network (LAN), wide area network (WAN), the Internet, or a combination thereof, and connects web sites, client devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., client A), such as a transaction management system that the first entity uses to manage its transactions with one or more other entities (e.g., other clients). The computing system 108 can host computer-implemented services of a second entity (e.g., client B), such as the transaction management system that the second entity uses to manage its transactions with one or more other entities (e.g., other clients). In the example of FIG. 1, the consortium blockchain network 102 is represented as a peer-to-peer network of nodes, and the computing systems 106, 108 provide nodes of the first entity, and second entity, respectively, which participate in the consortium blockchain network 102.

Figure 2:
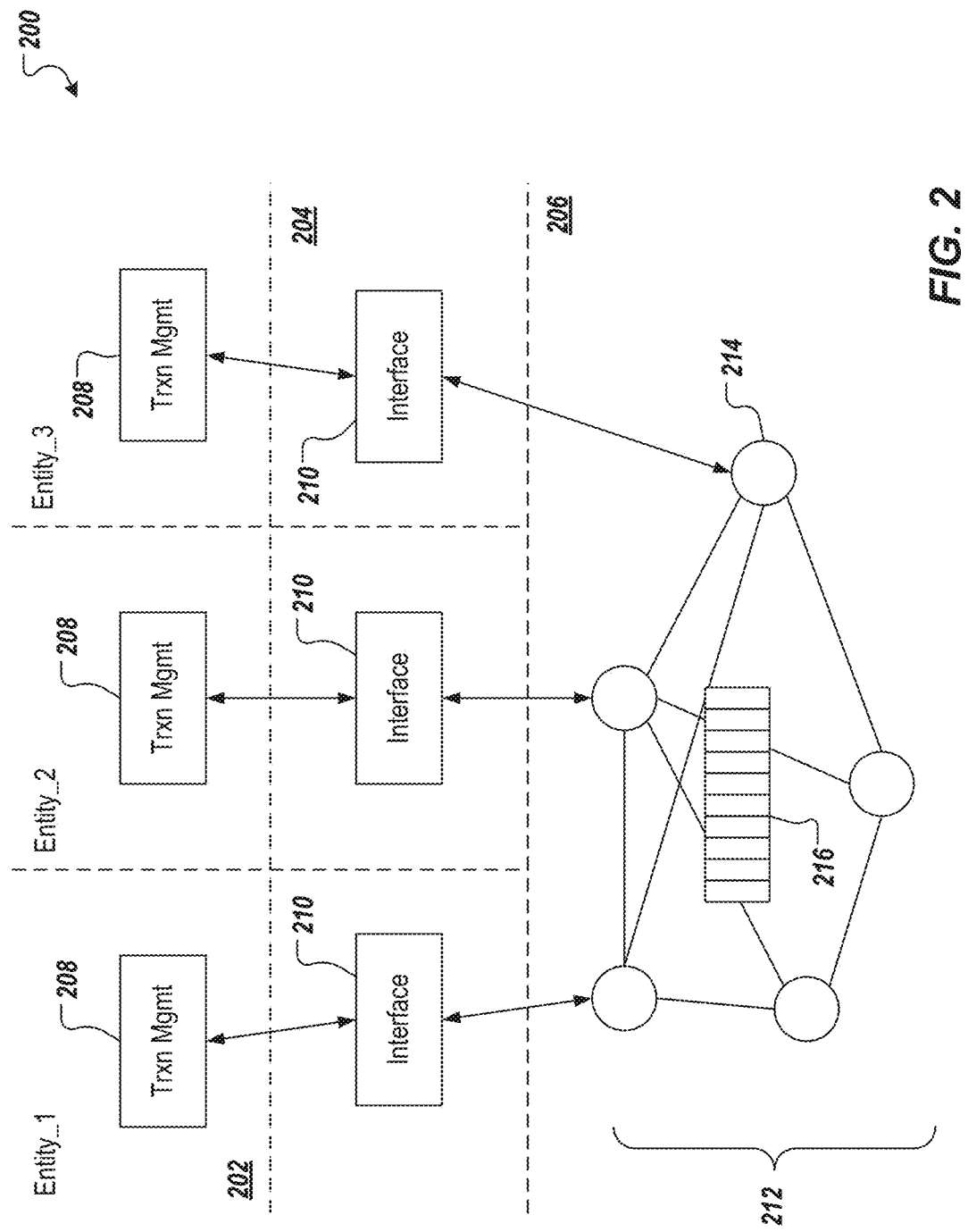
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interfaces 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

Figure 3:
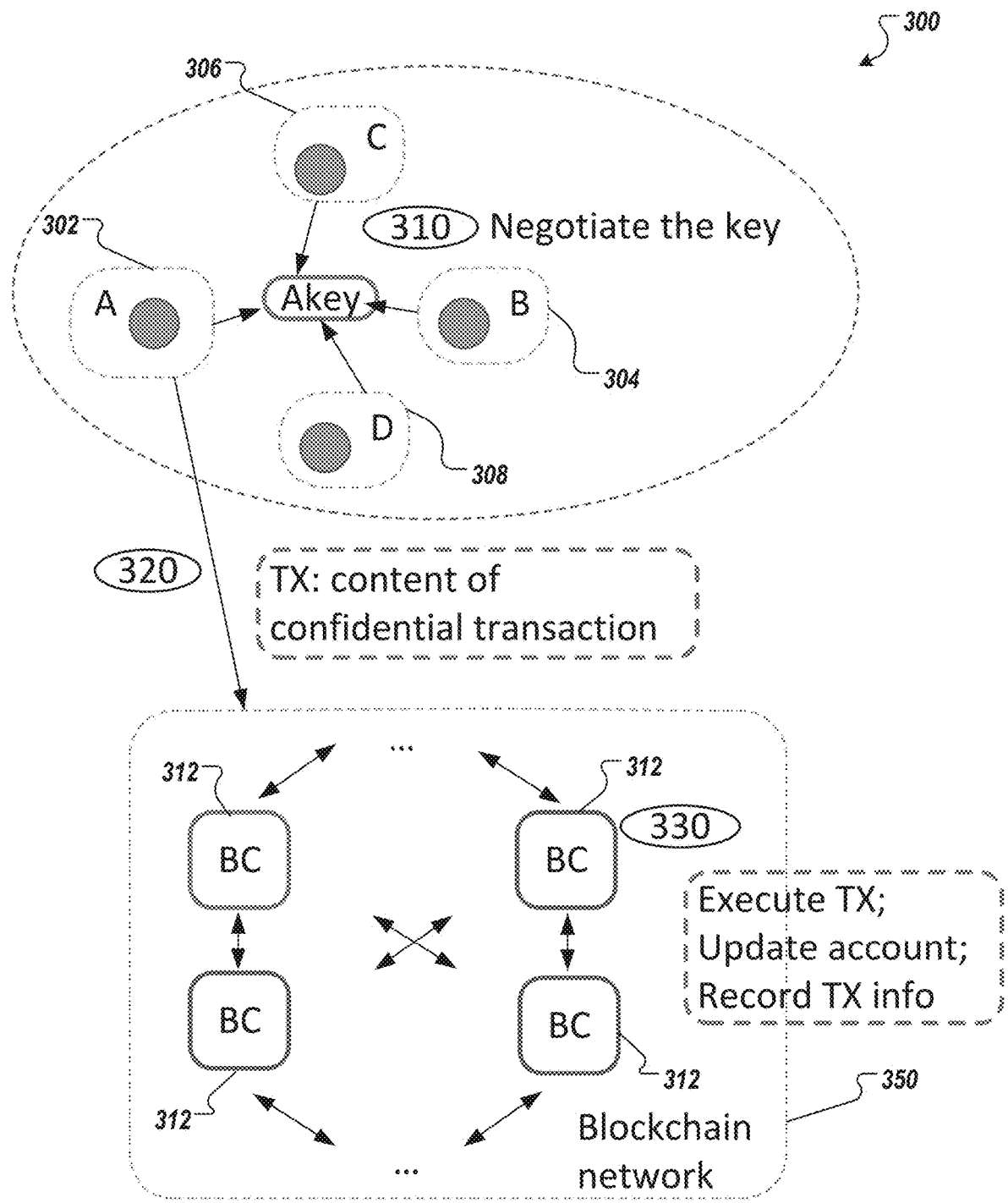
FIG. 3 depicts an example process 300 for preparing a confidential transaction in accordance with implementations of the present disclosure.

FIG. 3 depicts an example process 300 for preparing a confidential transaction in accordance with implementations of the present disclosure. Client nodes A 302, B 304, C 306, and D 308 represent participants of a threshold secret sharing scheme (also referred to as a threshold key sharing scheme). A threshold secret sharing scheme solves the problem of key security management by multiple parties. As an example secret sharing scheme, Shamir's secret sharing scheme (denoted as Shamir(k,n)) divides a secret key into n parts and assigned the n parts to n participants, respectively. Each participant has a unique share of the secret key. To reconstruct the original secret key, a minimum or threshold number of parts is required. In the threshold scheme, this minimum number, k, is less than the total number of parts, n. In other words, the original secret key can be recovered if at least k parts of the secret key are collected. The Shamir algorithm can use, for example, a Lagrangian difference algorithm or other methods to recover the secret key.

Here, Shamir(k,n) means that a plaintext m is encrypted and divided into n parts, and at least k parts are needed to recover the plaintext m. As shown in FIG. 3, the client node A 302 can generate a key, Akey, and decompose the Akey into four parts. Client node A 302 can keep one part and give a respective part to each of client nodes B 304, C 306, and D 308.

In some implementations, from the perspective of the client node A 302, at 310, the client node A 302 can negotiate and obtain a secret key, Akey, according to the Shamir's secret sharing scheme, denoted as Shamir(k,n), as described above. The values of the k and n can be determined, for example, by the client node A 302 or another party based on security and complexity considerations. In the example shown in FIG. 3, n could be 4 so that client nodes A 302, B 304, C 306, and D 308 are all the participants of the Shamir's secret sharing scheme. In this case, k can be 2 or 3 so that the client node A 302 can recover the secret key, Akey, from at least 2 or 3 participants out of all the participants, client nodes A 302, B 304, C 306, and D 308. As another example, k could be 4 and n could be greater than 4 so that the client node A 302 can recover the secret key, Akey, from at least 4 participants out of all the participants of the Shamir's secret sharing scheme.

In some implementations, the client node A 302 is an example of the computing systems 106, 108 corresponding to a first client or entity as described in FIGS. 1 and 2. The client node A 302 has a corresponding account (e.g., a public account or a private account) for transactions over a blockchain network 350. The blockchain network 350 can include multiple consensus nodes (such as blockchain nodes 312 in FIG. 3). In some implementations, the client nodes B 304, C 306, and D 308 may or may not be client nodes of the blockchain network 350. In other words, the client node A 302 can obtain the secret key independently from the blockchain network 350. For example, the client node A 302 can obtain the secret key from client nodes B 304, C 306, and D 308 through communications off the blockchain network 350.

In some implementations, the client node A 302 can perform a confidential transaction with another client node (e.g., a client node B 304) such that the transaction information is only viewable, or otherwise known, by client node A 302 and client node B 304, but not other parties (e.g., client node C 306 or D 308, or blockchain nodes 312 in the blockchain network 350).

At 320, the client node A 302 creates a confidential transaction to transfer an amount t to the client node B 304. In some implementations, client node A 302 can construct a content of the confidential transaction locally and submit the content of the confidential transaction to the blockchain network 350 (e.g., one or more blockchain node 312 in the blockchain network 350).

In some implementations, the confidential transaction can be constructed based on a commitment scheme to conceal the transaction data (e.g., the account balance before the transaction and the transaction amount). An example commitment scheme includes, without limitation, the Pedersen Commitment (PC). For example, the client node A 302 generates a commitment value based on a transaction amount t and a random number r using the PC. For example, the commitment value includes a cypher text that can be obtained according to $PC(t)=rG+tH$, where G and H can be generators of an elliptical curve, $PC(t)$ is a scalar multiplication of curve points, t is the value that is committed to. The PC commitment scheme has a homomorphism, that is, $PC(t_1)+PC(t_2)=PC(t_1+t_2)$. Holders of the cypher text $PC(t)$ can verify the transaction amount t by using the random number r. Although implementations of the present disclosure are described in further detail herein with reference to the PC, it is contemplated that implementations of the present disclosure can be realized using any appropriate commitment scheme.

In the example confidential transaction, client node A 302 can commit to a pre-transaction account balance a and a transfer amount t. In some implementations, client node A 302 can generate a commitment value PC(a) using PC based on the pre-transaction account balance a and a corresponding random number ra. Similarly, client node A 302 can generate a commitment value PC(t) using PC based on the pre-transaction account balance a and a corresponding random number rt. In some implementations, client node A 302 can also commit that it has sufficient funds so that the post-transaction balance a−t is large than, or equal to, 0. For example, client node A 302 can generate a commitment value PC(a−t), for example, based on the commitment values PC(a) and PC(t) given the homomorphic property of the PC. The commitment values can be included in the content of the confidential transaction.

In some implementations, the content of the confidential transaction can include one or more zero knowledge proofs to enable a receiving party to confirm that the information the sending party is sending is valid. The zero knowledge proofs enable the receiving party to do this without actual knowledge of the information being confirmed. The zero knowledge proofs can include range proof such as Proof (a−t>0), Proof (t>0), and Proof (a>0), or other types of proofs. The zero knowledge proofs enable the receiving party (e.g., client node B) to confirm that the sending party (e.g., client node A) has enough funds to transfer (i.e., a−t>0), and that the transfer amount is greater than zero, without knowing either the balance a from which the amount is being transferred, or even the transfer amount t.

In some implementations, for each Pedersen Commitment, the random number r and amount t can be encrypted using the secret key, Akey, to obtain the encrypted transaction information, M=Akey(r, t). The encrypted transaction information M can be included as part of the content of the confidential transaction.

In some implementations, the content of the example confidential transaction can include other transaction-related information, such as A's digital signature on the transaction.

After generating the transaction content, client node A 302 can submit the content of the confidential transaction to the blockchain network 350 (e.g., one or more blockchain node 312 in the blockchain network 350). At 330, the blockchain network 350 can execute the confidential transaction. In some implementations, the confidential transaction can be executed by each of the blockchain node 312 in the blockchain network 350. For example, each of the blockchain node 312 can determine whether the content of the confidential transaction is legitimate, for example, by verifying one or more commitment values and zero knowledge proofs included in the content of the confidential transaction. For example, each of the blockchain node 312 can verify the commitment values by verifying PC(a)=PC(t)+PC(a−t), that is, input transaction values is equal to output transaction values. Each of the blockchain node 312 can verify the zero knowledge proofs, for example, based on Bulletproofs, Monero's RingCT algorithms, or any other suitable algorithms.

In some implementations, after the commitment values and zero knowledge proofs have been verified, each of the blockchain nodes 312 can record the transaction and update the accounts of client node A 302 and client node B 304. For example, after the transaction, client node A 302 has an account balance a-t and client node B 304 has an account balance b+t. In some implementations, the post-transaction balance of client node A 302 and client node B 304 can be reflected by the direct operations of the commitment value due to the homomorphism of the commitment scheme. For example, client node A 302 can now have a commitment value of a post-transaction account balance PC (a−t)=PC (a)−PC(t). Client node B 304 can now have a commitment value of a post-transaction account balance PC(b+t)=PC(b)+PC(t).

In some implementations, each of the blockchain nodes 312 can record or store the encrypted transaction information. For example, the encrypted transaction information corresponding to the commitment PC(a), Ma=Akey(ra, a) and the encrypted transaction information corresponding to the commitment PC(t) Mt=Akey(rt, t) can be recorded in the blockchain by each blockchain nodes 312, wherein ra and rt represent random numbers corresponding to the amount a and t, respectively.

Figure 4:
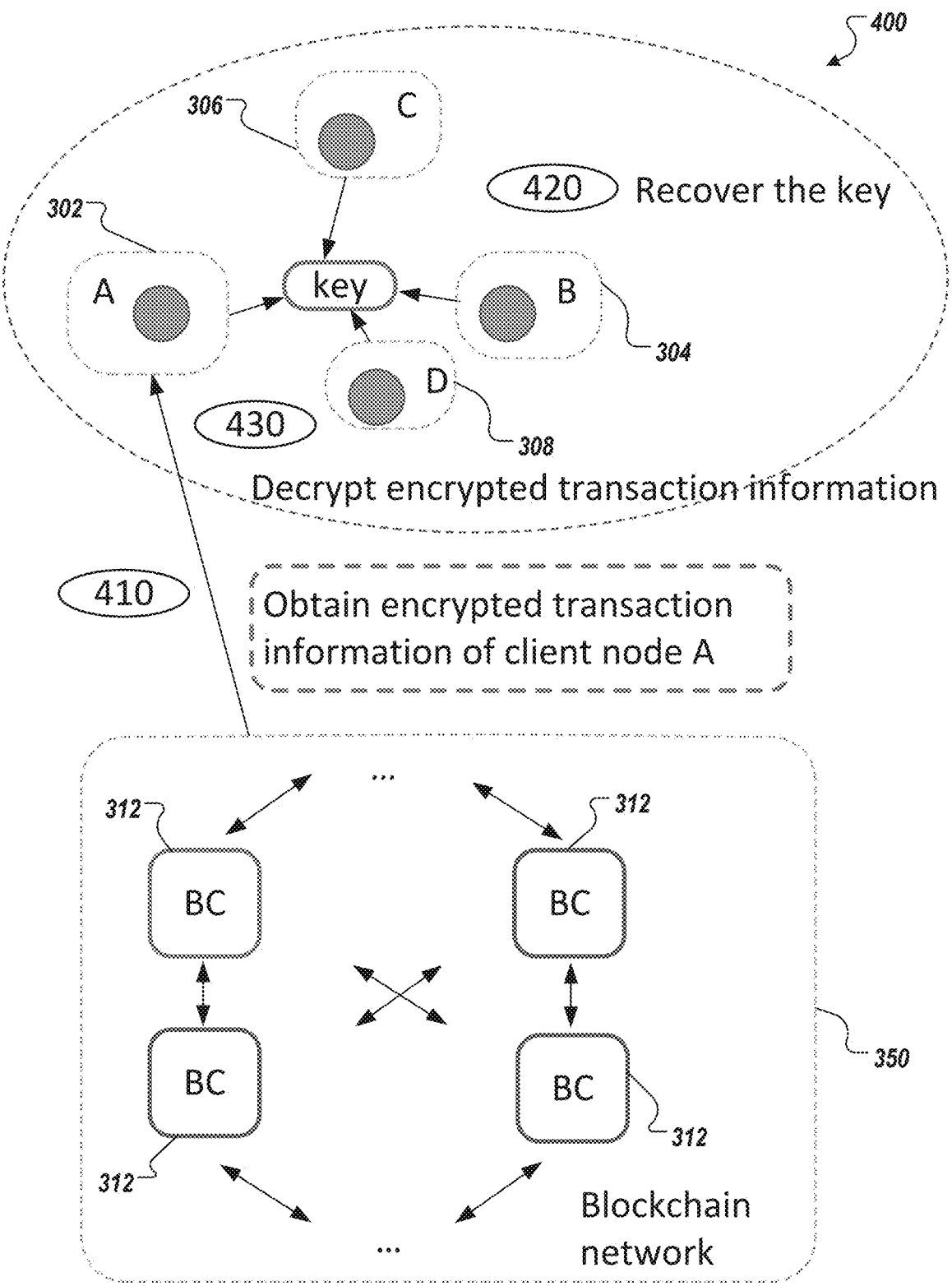
FIG. 4 depicts an example recovery process 400 of transaction information of a confidential transaction in accordance with implementations of the present disclosure.

FIG. 4 depicts an example recovery process 400 of transaction information of a confidential transaction in accordance with implementations of the present disclosure. For example, in a case where client node A 302 loses its key, Akey, and thus does not know the amount on its corresponding blockchain account. The client node A 302 can use the example recovery process 400 to recover the account amount of the client node A 302.

At 410, the client node A 302 obtains the encrypted transaction information under the Pedersen Commitment (e.g., Ma=Akey(ra, a) and Mt=Akey(rt, t)), for example, by downloading from, or synchronizing with, the blockchain node 312. In some implementations, the client node A 302 can save a local copy of the encrypted transaction information under the Pedersen Commitment.

At 420, the client node A 302 can communicate with client nodes B 304, C 306, and D 308, for example, to recover the key, Akey, according to the Shamir secret sharing scheme, for example, of the blockchain network 350.

With the recovered key, Akey, at 430, the client node A 302 can decrypt the encrypted transaction information corresponding to each Pedersen Commitment of the account of the client node 302 (e.g., Ma=Akey(ra, a) and Mt=Akey(rt, t)). Then the client node A 302 can decrypt the encrypted transaction information (e.g., Ma=Akey(ra, a) and Mt=Akey (rt, t)) using the recovered key, Akey and obtain the plaintext transaction information ra, a, rt, and t.

Figure 5:
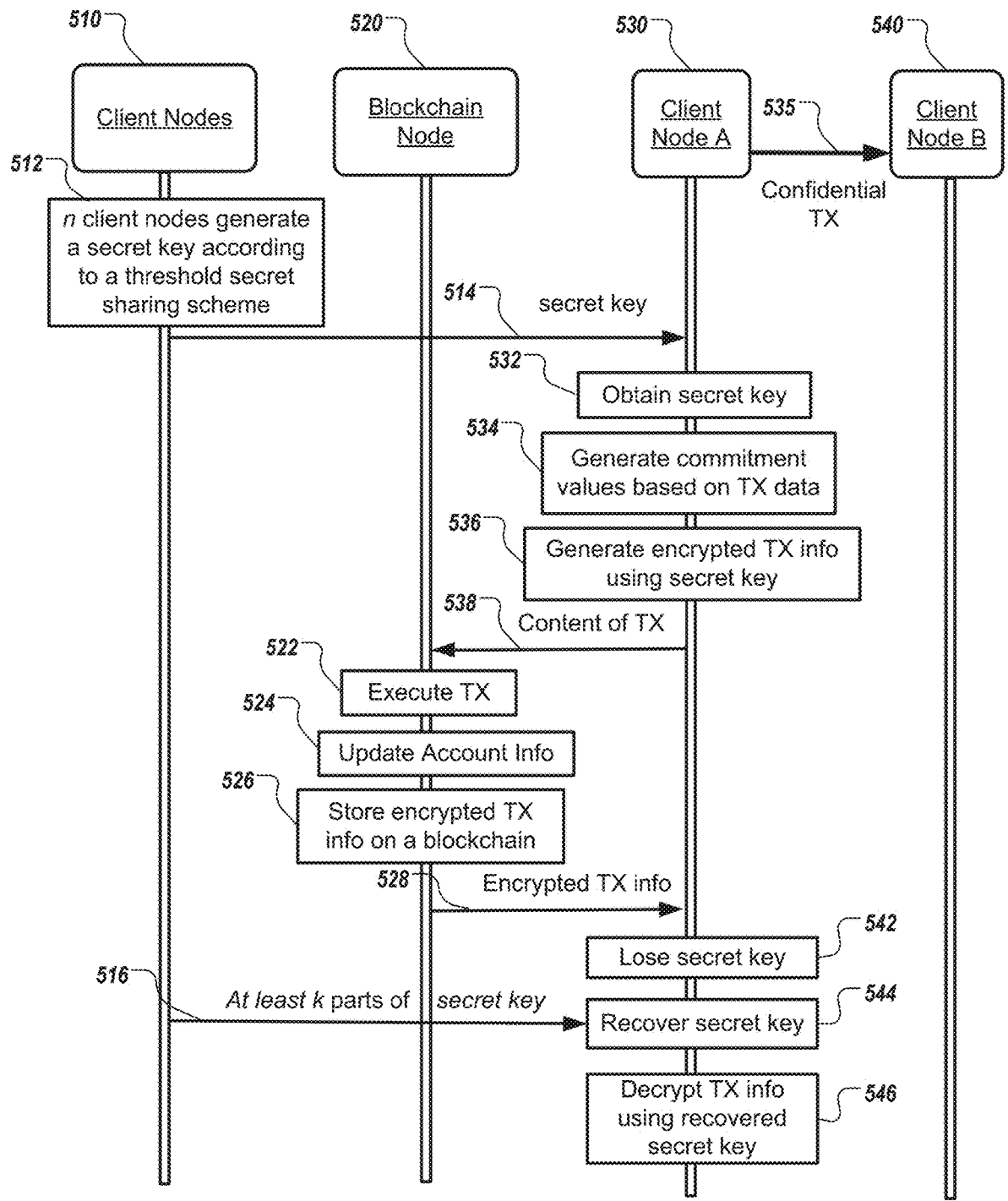
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices. For clarity of presentation, the description that follows generally describes method 500 in the context of the other figures in this description. For example, client nodes 510 can include client node C 306 and client node D 312; the blockchain node 520 can be the blockchain node 312; client node A 530 can be client node A 302; and client node B 540 can be client node B 304 as described with respect to FIGS. 3 and 4. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

At 512, a number of (e.g., n) client nodes 510 generate a secret key for a client node (e.g., client node A 530) of a blockchain network. In some implementations, the secret key can be negotiated or otherwise generated by a total number of (e.g., n) client nodes 510 according to a threshold secret sharing scheme agreed to by the total number of client nodes 510. In some implementations, the threshold secret sharing scheme comprises a Shamir's secret sharing scheme.

At 514, the number of client nodes 510 can issue the secret key to the client node A 530. The secret key can be used by the client node A 530 for encrypting and decrypting transaction information of a confidential transaction of the client node A 530.

At 532, the client node A 530 obtains the secret key according to a threshold secret sharing scheme agreed to by the total number of client nodes 510 (e.g., the total number of participants of the secret sharing scheme). The client node A 530 can use the secret key of the client node A 530 to encrypt transaction data of a confidential transaction of the client node A 530. The confidential transaction of the client node A 530 can be, for example, a confidential transaction 535 such as a transfer of an amount of funds from an account of the client node A 530 to an account of client node B 540. The client node A 530 can construct a content of the confidential transaction to protect privacy of transaction data and conceal the transaction data from being inspected by other entities except the participants of the transaction (i.e., client node A 530 and client node B 540 in this example). In some implementations, the client node A 530 can conceal the transaction data of the confidential transaction based on a commitment scheme and using the secret key obtained according to the threshold secret sharing scheme.

In some implementations, the transaction data of the confidential transaction comprises one or both of an account balance of the client node A 530 before the confidential transaction or a transaction amount of the confidential transaction. In some implementations, the transaction data of the confidential transaction can include additional transaction information (e.g., time of the transaction, parties of the transaction asset type (e.g., stock security or other type)).

At 534, the client node A 530 generates one or more commitment values of the confidential transaction of the client node A 530 by applying a cryptographic commitment scheme to transaction data of the confidential transaction. In some implementations, the cryptographic commitment scheme comprises a homomorphic cryptographic commitment scheme, such as a Pedersen Commitment scheme, or another type of commitment scheme.

At 536, the client node A 530 generates encrypted transaction information of the confidential transaction by encrypting the transaction data using the secret key of the client node A 530, wherein the encrypted transaction information is configured to allow decryption by the client node A 530 using the secret key.

In some implementations, the cryptographic commitment scheme comprises the Pedersen Commitment scheme. In this case, generating one or more commitment values of a confidential transaction of the client node by applying a cryptographic commitment scheme to transaction data comprises generating the one or more commitment values of the confidential transaction of the client node based on the transaction data and random numbers corresponding to the transaction data, and generating encrypted transaction information of the confidential transaction comprises generating encrypted transaction information of the confidential transaction by encrypting the transaction data and random numbers corresponding to the transaction data using the secret key of client node A 530.

At 538, the client node A 530 submits the content of the confidential transaction to the blockchain network for execution, for example, by transmitting the content of the confidential transaction to the blockchain node 520 (e.g., a consensus node of the blockchain network). In some implementations, the content of the confidential transaction can include the one or more commitment values of the confidential transaction generated by the client node A 530 by applying the cryptographic commitment scheme to transaction data of the confidential transaction, the encrypted transaction information generated by the client node A 530 by encrypting the transaction data using the secret key, and one or more zero-knowledge proofs of the transaction data.

In some implementations, the one or more zero-knowledge proofs of the transaction data comprises one or more zero-knowledge range proofs that values of the transaction data are within respective ranges. For example, the one or more zero-knowledge range proofs can include a zero-knowledge range proof that the account balance of the client node A 530 before the confidential transaction is larger than zero, a zero-knowledge range proof that the transaction amount of the confidential transaction is larger than zero, and a zero-knowledge range proof that the transaction amount is less than, or equal to, the account balance of the client node A 530 before the confidential transaction.

In some implementations, the content of the confidential transaction further comprises a digital signature of the client node A 530. In some implementations, the content of the confidential transaction can include additional or different information.

At 522, upon receiving the content of the confidential transaction, the blockchain node 520 can execute the confidential transaction, for example, by verifying the confidential transaction is valid based on the content of the confidential transaction. In some implementations, verifying that the confidential transaction is valid based on the content of the confidential transaction can include one or more of: determining that the one or more commitment values are correct based on the commitment scheme and/or the one or more zero-knowledge proofs; or verifying that one or more zero-knowledge proofs of the transaction data, for example, according to algorithms as described with respect to FIG. 3.

At 524, after verifying the confidential transaction is valid, the blockchain node 520 can update account information effected by the confidential transaction (e.g., the account balance of the client node A 530 and client node B 540). In some implementations, the cryptographic commitment scheme is homomorphic, and the blockchain node 520 can update account information based on homomorphism of the commitment scheme, for example, according to the techniques described with respect to FIG. 3 or other techniques.

At 526, the blockchain node 520 can store the encrypted transaction information on a blockchain of the blockchain network. In some implementations, the encrypted transaction information can be stored in more than one/all of consensus nodes of the blockchain network, thus providing robust backup of the encrypted transaction information of the client node A 530 in case the client node A 530 loses the secret key. In addition, the storage of the encrypted transaction information in the blockchain of the blockchain network can reduce or eliminate the client node A 530's reliance on a local or single-point storage scheme, improving security and reliability of the client node A 530's access to the encrypted transaction information.

At 528, the client node A 530 can retrieve or otherwise obtain the encrypted transaction information from the blockchain node 520 (e.g., a consensus node of the blockchain network). The encrypted transaction information is stored in at least one blockchain in the blockchain network. The client node A 530 can decrypt the plaintext transaction information from the encrypted transaction information using the secret key.

At 542, the client node A 530 determines that it loses or otherwise does not have access to the secret key configured to decrypt the encrypted transaction information, and the secret key was previously issued to the client node A 530.

At 544, in some implementations, in response to such a determination, the client node A 530 recovers the secret key from at least a threshold number (e.g., k) of client nodes among a total number (e.g., n) of client nodes in the blockchain network, according to a threshold secret sharing scheme (e.g., Shamir's secret sharing scheme) agreed to by the plurality of client nodes, for example, by receiving at least the threshold number of parts of the secret key from at least the threshold number of client nodes among the total number of client nodes in the blockchain network.

At 546, the client node A 530 decrypts transaction data (e.g., plaintext transaction data) of the confidential transaction of the client node A 530 from the encrypted transaction information using the recovered secret key. In some implementations, decrypting transaction data of the confidential transaction of the particular client node from the encrypted transaction information using the secret key comprises recovering a transfer amount of the confidential transaction using the secret key. In some implementations, decrypting transaction data of the confidential transaction of the particular client node from the encrypted transaction information using the secret key comprises recovering both a transfer amount of the confidential transaction and a random number corresponding to the transfer amount using the secret key, wherein the transfer amount and the random number are used in a Pedersen Commitment scheme for concealing transaction information of the confidential transaction of the particular client node.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a client, the features may be implemented on a computer having a display device such as a cathode ray tube (CRT) or liquid crystal display (LCD) monitor for displaying information to the client node A 302*nd* a keyboard and a pointing device such as a mouse or a trackball by which the client may provide input to the computer.

The features may be implemented in a computer system that includes a back-end component, such as a data server, or that includes a middleware component, such as an application server or an Internet server, or that includes a front-end component, such as a client computer having a graphical client interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client node A 302*nd* server are generally remote from each other and typically interact through a network, such as the described one. The relationship of client node A 302*nd* server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

The invention claimed is:

1. A computer-implemented method of a client node participating in a blockchain transaction, wherein the client node is connected to a plurality of other client nodes on a non-blockchain network, wherein the client node is connected to a plurality of consensus nodes on a blockchain network, and wherein the method comprises:
   obtaining, by the client node, a secret key according to a threshold secret sharing scheme, wherein the threshold secret sharing scheme is stored in a local data storage of the client node, and wherein the threshold secret sharing scheme comprises a threshold number of other client nodes for recovering the secret key;

storing, by the client node, the secret key in the local data storage of the client node;

generating, by the client node, a first commitment value of a pre-transaction account balance of the client node, a second commitment value of a transaction amount of the blockchain transaction, and a third commitment value of a post-transaction account balance of the client node;

generating, by the client node, encrypted transaction information by encrypting data of the blockchain transaction using the secret key, wherein the encrypted transaction information comprises the pre-transaction account balance and the transaction amount;

transmitting, by the client node and to a consensus node on the blockchain network, the encrypted transaction information, the first commitment value, the second commitment value, and the third commitment value;

retrieving, by the client node and from the consensus node on the blockchain network, the encrypted transaction information;

determining, by the client node, that the secret key is no longer present in the local data storage of the client node;

recovering, by the client node, the secret key from at least the threshold number of other client nodes according to the threshold secret sharing scheme; and decrypting, by the client node, the encrypted transaction information using recovered secret key to obtain the pre-transaction account balance and the transaction amount.

2. The method of claim 1, further comprising:

computing, by the client node, the first commitment value of the pre-transaction account balance of the client node using a cryptographic commitment scheme;

computing, by the client node, the second commitment value of the transaction amount of the blockchain transaction using the cryptographic commitment scheme; and computing, by the client node, the third commitment value of the post-transaction account balance of the client node based on the first commitment value and the second commitment value.

3. The method of claim 2, wherein:

computing, by the client node, the first commitment value of the pre-transaction account balance of the client node using the cryptographic commitment scheme comprises:

computing, by the client node, the first commitment value based on the pre-transaction account balance and a first random number using the cryptographic commitment scheme comprises; and computing, by the client node, the second commitment value of the transaction amount of the blockchain transaction using the cryptographic commitment scheme comprises:

computing, by the client node, the second commitment value based on the transaction amount and a second random number using the cryptographic commitment scheme.

4. The method of claim 3, wherein generating, by the client node, the encrypted transaction information by encrypting the data of the blockchain transaction using the secret key comprises:

generating, by the client node, first encrypted transaction data by encrypting the pre-transaction account balance using the secret key;

generating, by the client node, second encrypted transaction data by encrypting the transaction amount using the secret key; and generating, by the client node, the encrypted transaction information comprising the first encrypted transaction data and the second encrypted transaction data.

5. The method of claim 4, wherein:

generating, by the client node, the first encrypted transaction data by encrypting the pre-transaction account balance using the secret key comprises:

generating, by the client node, the first encrypted transaction data by encrypting the pre-transaction account balance and the first random number using the secret key; and generating, by the client node, the second encrypted transaction data by encrypting the transaction amount using the secret key comprises:

generating, by the client node, the second encrypted transaction data by encrypting the transaction amount and the second random number using the secret key.

6. The method of claim 2, further comprising:

sending, by the client node, one or more zero-knowledge proofs of the pre-transaction account balance and the transaction amount to the consensus node on the blockchain network.

7. The method of claim 6, wherein the one or more zero-knowledge proofs of the pre-transaction account balance and the transaction amount comprise one or more zero-knowledge range proofs that values of the pre-transaction account balance and the transaction amount are within respective ranges.

8. A non-transitory, computer-readable medium storing one or more instructions executable by a client node participating in a blockchain transaction, wherein the client node is connected to a plurality of other client nodes on a non-blockchain network, wherein the client node is connected to a plurality of consensus nodes on a blockchain network, and wherein the one or more instructions cause the client node to perform operations comprising:

obtaining a secret key according to a threshold secret sharing scheme, wherein the threshold secret sharing scheme is stored in a local data storage of the client node, and wherein the threshold secret sharing scheme comprises a threshold number of other client nodes for recovering the secret key;

storing the secret key in the local data storage of the client node;

generating a first commitment value of a pre-transaction account balance of the client node, a second commitment value of a transaction amount of the blockchain transaction, and a third commitment value of a post-transaction account balance of the client node;

generating encrypted transaction information by encrypting data of the blockchain transaction using the secret key, wherein the encrypted transaction information comprises the pre-transaction account balance and the transaction amount;

transmitting, to a consensus node on the blockchain network, the encrypted transaction information, the first commitment value, the second commitment value, and the third commitment value;

retrieving, from the consensus node on the blockchain network, the encrypted transaction information;

determining that the secret key is no longer present in the local data storage of the client node;

recovering the secret key from at least the threshold number of other client nodes according to the threshold secret sharing scheme; and decrypting the encrypted transaction information using recovered secret key to obtain the pre-transaction account balance and the transaction amount.

9. The non-transitory, computer-readable medium of claim 8, wherein the operations further comprise:

computing, by the client node, the first commitment value of the pre-transaction account balance of the client node using a cryptographic commitment scheme;

computing, by the client node, the second commitment value of the transaction amount of the blockchain transaction using the cryptographic commitment scheme; and computing, by the client node, the third commitment value of the post-transaction account balance of the client node based on the first commitment value and the second commitment value.

10. The non-transitory, computer-readable medium of claim 9, wherein:

computing, by the client node, the first commitment value of the pre-transaction account balance of the client node using the cryptographic commitment scheme comprises:

computing, by the client node, the first commitment value based on the pre-transaction account balance and a first random number using the cryptographic commitment scheme comprises; and computing, by the client node, the second commitment value of the transaction amount of the blockchain transaction using the cryptographic commitment scheme comprises:

computing, by the client node, the second commitment value based on the transaction amount and a second random number using the cryptographic commitment scheme.

11. The non-transitory, computer-readable medium of claim 10, wherein generating, by the client node, the encrypted transaction information by encrypting the data of the blockchain transaction using the secret key comprises:

generating, by the client node, first encrypted transaction data by encrypting the pre-transaction account balance using the secret key;

generating, by the client node, second encrypted transaction data by encrypting the transaction amount using the secret key; and generating, by the client node, the encrypted transaction information comprising the first encrypted transaction data and the second encrypted transaction data.

12. The non-transitory, computer-readable medium of claim 11, wherein:

generating, by the client node, the first encrypted transaction data by encrypting the pre-transaction account balance using the secret key comprises:

generating, by the client node, the first encrypted transaction data by encrypting the pre-transaction account balance and the first random number using the secret key; and generating, by the client node, the second encrypted transaction data by encrypting the transaction amount using the secret key comprises:

generating, by the client node, the second encrypted transaction data by encrypting the transaction amount and the second random number using the secret key.

13. The non-transitory, computer-readable medium of claim 9, wherein the operations further comprise:

sending, by the client node, one or more zero-knowledge proofs of the pre-transaction account balance and the transaction amount to the consensus node on the blockchain network.

14. The non-transitory, computer-readable medium of claim 13, wherein the one or more zero-knowledge proofs of the pre-transaction account balance and the transaction amount comprise one or more zero-knowledge range proofs that values of the pre-transaction account balance and the transaction amount are within respective ranges.

15. A computer-implemented system, wherein the computer-implemented system is a client node participating in a blockchain transaction, wherein the client node is connected to a plurality of other client nodes on a non-blockchain network, wherein the client node is connected to a plurality of consensus nodes on a blockchain network, and wherein the computer-implemented system comprises:

one or more computers; and one or more computer memory devices interoperably coupled with the one or more computers and having tangible, non-transitory, machine-readable media storing one or more instructions that, when executed by the one or more computers, perform one or more operations comprising:

obtaining a secret key according to a threshold secret sharing scheme, wherein the threshold secret sharing scheme is stored in a local data storage of the client node, and wherein the threshold secret sharing scheme comprises a threshold number of other client nodes for recovering the secret key;

storing the secret key in the local data storage of the client node;

generating a first commitment value of a pre-transaction account balance of the client node, a second commitment value of a transaction amount of the blockchain transaction, and a third commitment value of a post-transaction account balance of the client node;

generating encrypted transaction information by encrypting data of the blockchain transaction using the secret key, wherein the encrypted transaction information comprises the pre-transaction account balance and the transaction amount;

transmitting, to a consensus node on the blockchain network, the encrypted transaction information, the first commitment value, the second commitment value, and the third commitment value;

retrieving, from the consensus node on the blockchain network, the encrypted transaction information;

determining that the secret key is no longer present in the local data storage of the client node;

recovering the secret key from at least the threshold number of other client nodes according to the threshold secret sharing scheme; and decrypting the encrypted transaction information using recovered secret key to obtain the pre-transaction account balance and the transaction amount.

16. The computer-implemented system of claim 15, wherein the one or more operations further comprise:

computing, by the client node, the first commitment value of the pre-transaction account balance of the client node using a cryptographic commitment scheme;

computing, by the client node, the second commitment value of the transaction amount of the blockchain transaction using the cryptographic commitment scheme; and computing, by the client node, the third commitment value of the post-transaction account balance of the client node based on the first commitment value and the second commitment value.

17. The computer-implemented system of claim 16, wherein:

computing, by the client node, the first commitment value of the pre-transaction account balance of the client node using the cryptographic commitment scheme comprises:

computing, by the client node, the first commitment value based on the pre-transaction account balance and a first random number using the cryptographic commitment scheme comprises; and computing, by the client node, the second commitment value of the transaction amount of the blockchain transaction using the cryptographic commitment scheme comprises:

computing, by the client node, the second commitment value based on the transaction amount and a second random number using the cryptographic commitment scheme.

18. The computer-implemented system of claim 17, wherein generating, by the client node, the encrypted transaction information by encrypting the data of the blockchain transaction using the secret key comprises:

generating, by the client node, first encrypted transaction data by encrypting the pre-transaction account balance using the secret key;

generating, by the client node, second encrypted transaction data by encrypting the transaction amount using the secret key; and generating, by the client node, the encrypted transaction information comprising the first encrypted transaction data and the second encrypted transaction data.

19. The computer-implemented system of claim 18, wherein:

generating, by the client node, the first encrypted transaction data by encrypting the pre-transaction account balance using the secret key comprises:

generating, by the client node, the first encrypted transaction data by encrypting the pre-transaction account balance and the first random number using the secret key; and generating, by the client node, the second encrypted transaction data by encrypting the transaction amount using the secret key comprises:

generating, by the client node, the second encrypted transaction data by encrypting the transaction amount and the second random number using the secret key.

20. The computer-implemented system of claim 16, wherein the one or more operations further comprise:

sending, by the client node, one or more zero-knowledge proofs of the pre-transaction account balance and the transaction amount to the consensus node on the blockchain network.

* * * * *